United States Patent [19]

Schmidt

[11] Patent Number: 4,754,986
[45] Date of Patent: Jul. 5, 1988

[54] LOAD DISTRIBUTOR WITH ARTICULATED GROUND SUPPORT

[75] Inventor: Kenneth J. Schmidt, Springfield, Oreg.

[73] Assignee: General Trailer Co., Springfield, Oreg.

[21] Appl. No.: 98,857

[22] Filed: Sep. 21, 1987

Related U.S. Application Data

[62] Division of Ser. No. 6/809,241, Dec. 16, 1985, Pat. No. 4,705,288.

[51] Int. Cl.$^4$ .................. B62D 13/02; B62D 53/00
[52] U.S. Cl. .................. 280/81 A; 37/DIG. 13; 280/43.23; 280/405 R; 280/461 R
[58] Field of Search .............. 280/81 A, 81 R, 405 R, 280/415 A, 415 B, 426, 433, 461 R, 482, 43.23; 37/108 R, DIG. 10, DIG. 13

[56] References Cited

U.S. PATENT DOCUMENTS

| | | | |
|---|---|---|---|
| 2,360,902 | 10/1944 | Simmons | 280/461 R X |
| 2,828,142 | 3/1958 | Hamblin | 280/405 R |
| 3,479,049 | 11/1969 | Duecy | 280/81 R |
| 4,705,288 | 11/1987 | Schmidt | 280/405 R |

Primary Examiner—John J. Love
Assistant Examiner—Mitchell J. Hill
Attorney, Agent, or Firm—Kolisch, Hartwell & Dickinson

[57] ABSTRACT

An axle load-distributing apparatus includes an auxiliary frame having a load-distributing axle mounted thereon. The axle is supported by wheels which ultimately support a portion of the weight of a load carried on a load-carrying frame. An attachment device is provided for securing the frame to the load-carrying frame. An articulation device for providing articulation of the load-distributing axle relative to the load-carrying frame is provided as is a load distribution device which is operable to distribute a portion of the weight carried on the load-carrying frame to the load-distributing axle. The load distributing device is located intermediate of the attachment device and the articulation device.

3 Claims, 3 Drawing Sheets

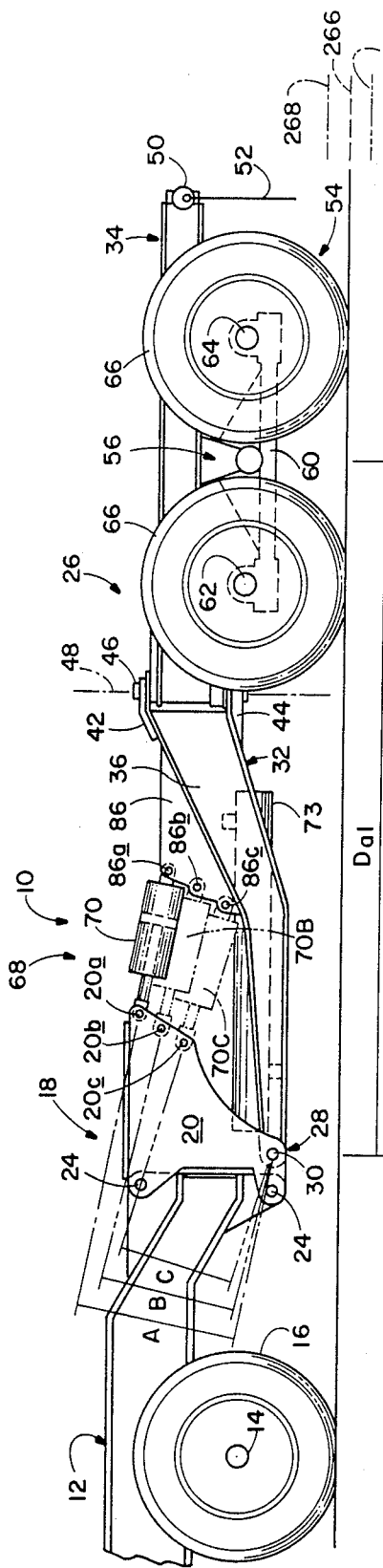

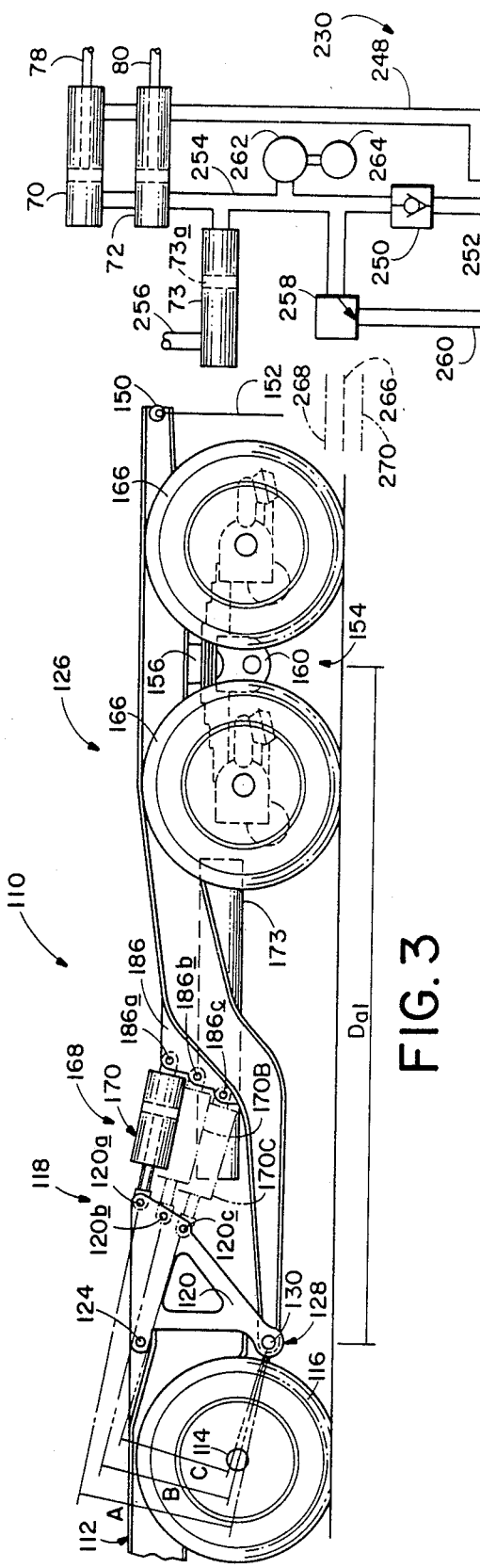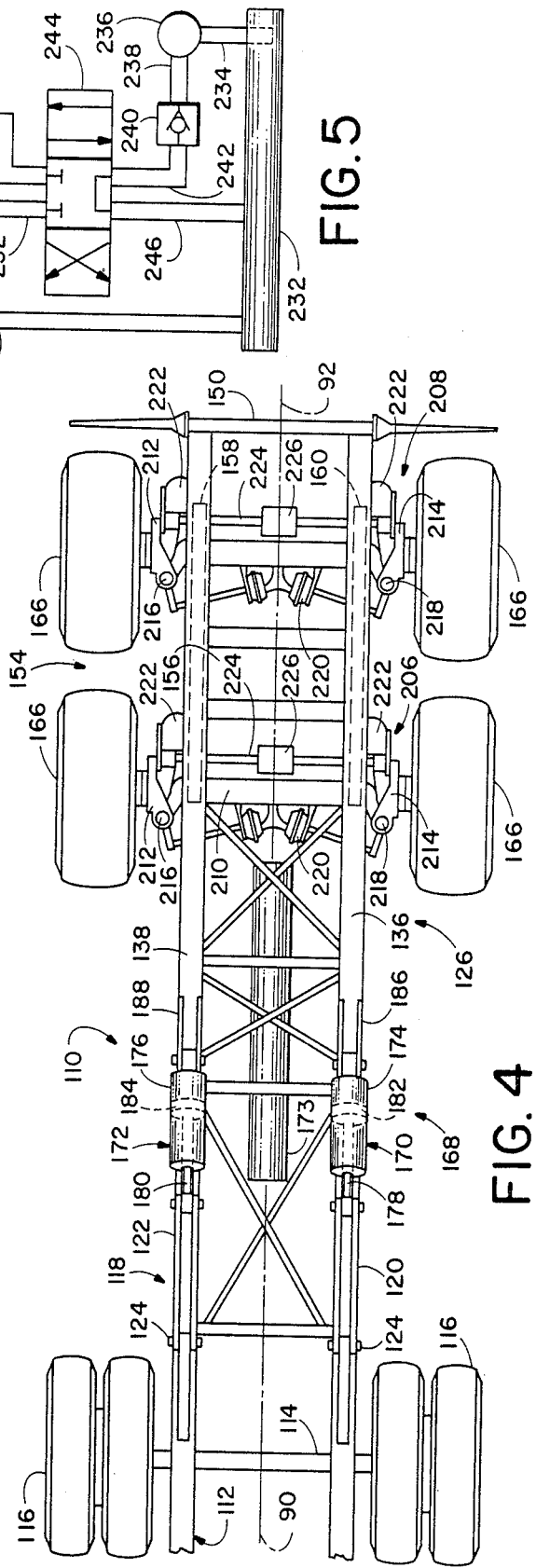

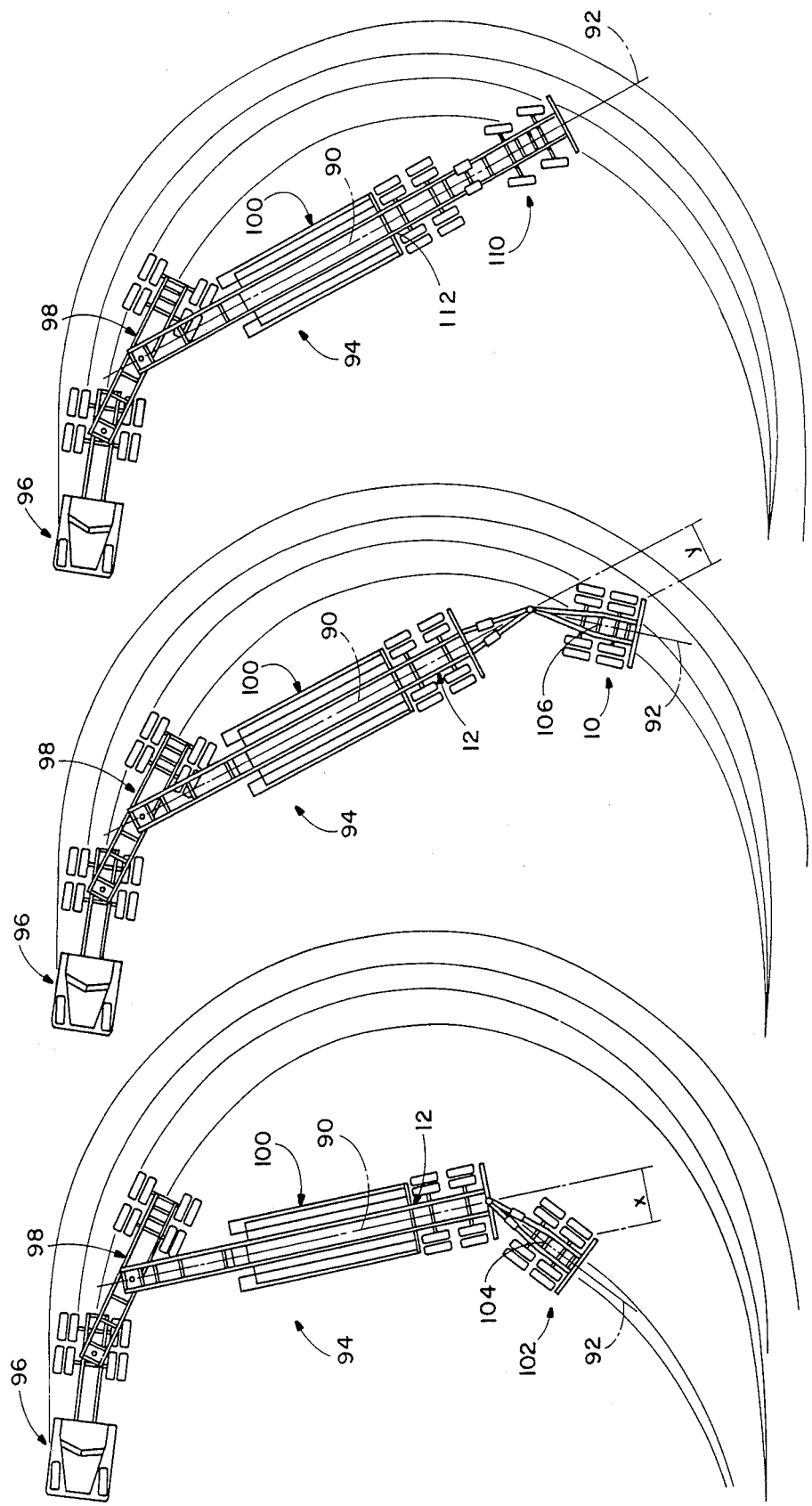

LOAD DISTRIBUTOR WITH ARTICULATED GROUND SUPPORT

This is a division of application Ser. No. 06/809,241 filed Dec. 16, 1985, now U.S. Pat. No. 4,705,288, issued Nov, 10, 1987.

BACKGROUND AND SUMMARY OF THE INVENTION

The instant invention relates to an axle load-distributing apparatus. Specifically, the apparatus of the invention provides the load-distributing apparatus having an articulated portion which enables the apparatus to remain in a substantially coaxial relationship with a load-carrying frame.

A variety of axle load-distributing devices are known. One such device is disclosed in my U.S. Pat. No. 3,485,505. Although the device described in that patent is useful for distributing a load to more axles than are present on the main load-carrying frame, a tip-inducing moment is generated about the longitudinal axis of the vehicle when the vehicle negotiates a turn due to the substantial misalignment of the main vehicle longitudinal axis and the corresponding axis of the load-distributing apparatus. The generated moment can become excessive if the vehicle is traversing uneven ground when it can cause the load-carrying vehicle to tip, thereby shifting its load and potentially turning on its side.

An object of the instant invention is to provide a load-distributing apparatus which remains substantially coaxial with a load-carrying frame.

Another object of the instant invention is to provide a load-distributing apparatus which is able to distribute heavy loads to multiple axles while the vehicle is traversing uneven terrain while maintaining a substantially constant axle load.

A further object of the instant invention is to provide a load-distributing apparatus which includes an articulation point between the wheels of the load-distributing apparatus and the main frame wherein the articulation point is distally removed from the main load-carrying frame.

The axle load-distributing apparatus of the instant invention includes an auxiliary frame having a load-distributing axle mounted thereon. The axle is supported by wheels which ultimately support a portion of the weight of a load carried on a load-carrying frame. An attachment device is provided for securing the auxiliary frame to the load-carrying frame. An articulation device for providing articulation of the load-distributing axle relative to the load-carrying frame is provided as is a load-distribution device which is operable to distribute a portion of the weight carried on the load-carrying frame to the load-distributing axle. The load-distributing device is located intermediate of the attachment device and the articulation device.

These and other objects and advantages of the instant invention become more fully apparent as the description which follows is read in conjunction with the drawings.

DESCRIPTION OF THE DRAWINGS

FIG. 1 is a side view of an axle load-distributing apparatus constructed according to the invention.

FIG. 2 is a top view of the apparatus of FIG. 1.

FIG. 3 is a side view of a second form of an axle load-distributing apparatus constructed according to the invention.

FIG. 4 is a top view of the apparatus of FIG. 3.

FIG. 5 is a schematic view of a hydraulic load-distributing system for use with the invention FIG. 6 is a schematic representation of the operation of a prior art load-distributing apparatus.

FIG. 7 is a schematic representation of the operation of the apparatus of FIGS. 1 and 2.

FIG. 8 is a schematic representation of the operation of the apparatus of FIGS. 3 and 4.

DETAILED DESCRIPTION OF THE PREFERRED EMBODIMENT

Turning initially to FIGS. 1 and 2, an axle load-distributing apparatus is shown generally at 10. Apparatus 10 is constructed and intended for use with an elongate, load-carrying frame 12 which is mounted for movement across the ground on an axle 14 which has wheels 16 mounted thereon. Frame 12 carries a load (not shown) and a portion of the weight of the load carried on frame 12 is distributed to apparatus 10.

Apparatus 10 includes a detachable bracket, or attachment means, 18. Bracket 18 includes a left mount 20 and a right mount 22. Mounts 20 and 22 are fixed to frame 12 by removable pins 24. Pins 24 affix bracket 18 to frame 12 such that bracket 18, when it is attached to frame 12, does not shift, in any plane, relative to frame 12.

An auxiliary frame 26 is pivotally attached to bracket 18 at pivot point 28 by a pivotable connection 30. Auxiliary frame 26 includes a first portion, or connecting means, shown generally at 32, and a second portion, or subframe, shown generally at 34. Connecting means 32, in the preferred embodiment, includes two arms 36, 38, the forward portion (left side in Figs.) of which are affixed to bracket 18 at pivot point 28. The other end of arms 36, 38 are joined together and connect with subframe 34 through a hinge connection, shown generally at 40.

Hinge connection 40 includes an upper plate 42 and a lower plate 44 which connect, by means of a pintle 46 which extends between upper plate 42, through subframe 34 and into lower plate 44. Pintle 46 defines a vertical axis 48 which allows for horizontal swinging of subframe 34 relative to connecting means 32.

Subframe 34 has a crossbar 50 mounted at its rear end, which is operable to support mud flaps 52. A load-distributing axle, shown generally at 54, is mounted on subframe 34 and is operable to support a portion of the weight of the load carried on load-carrying frame 12, through a mechanism which will be described later herein. In the preferred embodiment, load-distributing axle 54 includes an axle truck support 56 which supports two axle mounts 58, 60. Axles 62, 64 are carried on mounts 58, 60 and have wheels 66 carried thereon. Other numbers of axles may be used.

Load-distribution means are shown generally at 68 and are operable to distribute a portion of the weight of the load carried on the load-carrying frame to the load-distributing axle. One form of load-distributing means is disclosed in my previously identified U.S. Pat. No. 3,485,505. The load-distribution means of the present invention includes a pair of fluid-pressure-operated extensible-contractable rams 70, 72 which are located intermediate bracket 18 and hinge 40. Rams, or ram means, 70, 72 include, respectively, cylinders 74, 76, arms 78, 80 and pistons 82, 84. Although two rams are used in the preferred embodiment other numbers of rams may be provided to distribute a portion of the load to the load-distributing axle.

Mounts 20 and 22 of bracket 18 have multiple mounting points, such as points 20a, 20b and 20c on left mount 20. Connecting means arms 36, 38 each have a cylinder mount 86, 88, respectively, carried thereon. Each cylinder mount has mounting points, such as 86a, 86b and 86c, corresponding to the mounting points on the bracket mount. Rams 70 and 72 are shiftable between corresponding mounting points for reasons which will be explained later herein.

The load-distributing apparatus is operable, through the action of cylinder 70, 72 to shift a portion of the load carried on frame 12 to wheels 66 through load-distributing axle 54. This transfer of weight is accomplished by pivoting auxiliary frame 26 about pivot point 28 thereby to adjust auxiliary frame 26 in the vertical relative to the load-carrying frame.

An important feature of the instant invention is the displacement away from the load-carrying frame of hinge connection, or articulation means, 40. The articulation means allows articulation of the load-distributing axle relative to the load-carrying frame and the displacement of the articulation means away from the load-carrying frame reduces a tip-inducing moment which is generated about a longitudinal axis 90 of the vehicle and the corresponding axis 92 of the load-distributing apparatus as the vehicle with the apparatus connected thereto negotiates a turn.

Referring now to FIG. 6, a vehicle 94 is depicted, with a load-distributing apparatus constructed according to the prior art. Vehicle 94 includes a tractor section 96, a first trailing section 98, and a second trailing section 100, which includes a load-carrying frame 12, and a load-distributing apparatus 102. A rearward extension of vehicle axis 90 is spaced from the load-bearing center 104 of apparatus 102 by a distance X. X may be as much as 9 feet in some forms of apparatus 102 and provides, therefore, a 9 foot tipping arm about axis 90. If the vehicle is negotiating uneven terrain as it is turning, as would frequently be expected to occur when the vehicle is moving over unimproved roads, the tipping arm could result in the tipping of trailing section 100 on its side and resultant damage to any load carried thereon.

Turning now to FIG. 7, vehicle 94 is depicted with axle load-distributing apparatus 10 connected at the rear thereof. In this configuration, the rearward projection of axis 90 is offset from load-bearing center 106 of apparatus 10 by a distance Y. A configuration of apparatus 10 constructed to distribute the same amount of weight as apparatus 102 would be constructed such that distance Y was approximately 5 feet, a reduction of nearly 50% in the length of the tipping arm. A vehicle so equipped would be able to negotiate sharp turns on relatively uneven terrain without upsetting the load carried on trailing section 100.

A second embodiment of a load-distributing apparatus constructed according to the invention is depicted in FIGS. 3 and 4 and the operation of the second embodiment is depicted in FIG. 8. Elements of the second embodiment which correspond to elements of the embodiment depicted in FIGS. 1 and 2 are similarly numbered, with a value of 100 having been added to the similar reference numbers.

Apparatus 110 is connected to load-carrying frame 112 by bracket, or attachment means, 118. The auxiliary frame 126 of apparatus 110 includes arms 136, 138 which extend from pivot point 128 rearward and have a load-distributing axle 154 attached thereto.

In this embodiment, the load-distributing axle includes axle mounts 158, 160, and self-steering type axles 206, 208. Again, one or more axles may h=provided Axles 206, 208, include an intermediate axle portion 210 which has steering portions 212, 214 connected at either end thereof by king pins 216, 218. The self-steering axles further include a damper assembly 220 and brake mechanism 222. A tie rod 224 connects steering portions 212 and 214 and a backup lock 226 is selectively operable to prevent movement of tie rod 224.

To explain the operation of apparatus 110, and now referring to FIGS. 3, 4 and 8, as vehicle 94 negotiates a turn, vehicle axis 90 and load-distributing apparatus axis 92 remain coaxial as axles 206, 208 self-steer, thereby eliminating any tipping moment about axis 90.

In this embodiment, articulation means is defined by king pins 216, 218 which allows wheels 166 to turn while allowing auxiliary frame 126 to remain in line with load-carrying frame 112.

To explain the operation of load-distributing means, auxiliary frames 26, 126, are pivotably mounted for swinging about a substantially horizontal axis to attachment means 18, 118 at a pivot point 28, 128, respectively. The arrangement of the auxiliary frame and the rams provide that the rams are operable to transfer a portion of the weight of the load carried on the load-carrying frame to the auxiliary frame and the load-distributing axles.

The provision of multiple mounting points enables an operator to vary the effective length of the rams by shifting the rams between corresponding mounting points and then pressurizing the rams to a predetermined pressure, which will enable redistribution of the load and the carrying of a portion of the load by each axle within a known load range, preferably plus or minus 1%. Although the apparatus as described includes two rams, one or more rams may be used.

Accumulators 70, 173 are provided to cooperate with the rams and act to cushion the rams as the auxiliary frame moves vertically about pivot point 28, 128. Again, one or more accumulators may be used.

Referring now to FIG. 5, a hydraulic system for the rams is depicted generally at 230. System 230 includes a reservoir 232 which is connected by a conduit 234 to a pump 236. Pump 236 is connected by a conduit 238 to a check valve 240 and then by another conduit 242 to a main control valve 244. Valve 244 is connected directly to reservoir 232 by a conduit 246.

A conduit 248 is connected to control valve 244 and to the retraction side of rams 70, 72. A pilot check valve 250 is connected to main control valve 244 by a conduit 252. The pilot inlet of check valve 250 is connected to conduit 248. Conduit 254 is connected to the extension sides of rams 70, 72 and also to accumulator 73. Accumulator 73 has a piston 73a mounted therein which is operable to reciprocally move within the cylinder. A conduit 256 is connected to an air supply (not shown). Conduit 254 is also connected to a pressure relief valve 258 which is connected to reservoir 232 by a conduit 260. Also connected to conduit 254 is a pressure indicator 262 and a remote indicator 264.

The operation of system 260 is fully explained in my previously identified patent, but briefly, with the valve spool of valve 244 shifted to the right in FIG. 5, fluid in conduits 252–254 will be pressurized and fluid in conduit 248 will be allowed to return to reservoir 232, thus extending arms 78, 80. With the valve spool shifted to the left, conduit 248 will be pressurized and arms 78, 80 will be retracted. The pressure of the fluid in conduit 254 is indicated on indicator 262 and remote indicator 264.

The amount of load transferred between load-carrying frame 12 and auxiliary frame 26 is determined by the formula:

$$\text{LOAD TRANSFERRED} = \frac{C_p \times C_a \times D_{ra}}{D_{al}}$$

Where: $C_p$ equals cylinder pressure, $C_a$ equals area of the cylinder pistons, $D_{ra}$ is equal to the ram arm distance, and $D_{al}$ is equal to the axle lever distance. In the embodiments described, two 7×12 cylinders are used for cylinders 70, 72. The total cylinder piston area is therefore 76.97 square inches. $D_{al}$ has a length of 142 inches in the preferred embodiment of apparatus 10.

$D_{ra}$ is a function of the lever arm distance between an extension of the ram arms and pivot point 28. For instance, the arm distance A (FIG. 1) between point 28 and the extension of arms 78, 80, with the rams mounted in mounts "a," in the preferred embodiment is 33.375 inches. Arm B has a length of 30 inches and arm C has a length of 24.625 inches. Assuming that cylinders 70, 72 are mounted in the pivot points corresponding to arm A, a pressure of 2,100 lb/in$^2$ applied to the extension end of cylinder 70, 72 would be operable to transfer approximately 38,000 pounds from load-carrying frame 12 to auxiliary frame 26.

As the vehicle traverses the ground, variations in the surface may be expected such that auxiliary frame 26 will pivot about pivot point 28 placing wheels 66 on a level different from that of wheels 16. As the auxiliary frame so pivots, the length of $D_{ra}$ will change slightly as pistons 82, 84 move within cylinders 74, 76. Although there is also a change in the effective length of $D_{al}$ as such shifting occurs, that change is negligible when compared to that in $D_{ra}$, and may be, for all practical purposes, ignored. $C_a$ has a fixed value. The cylinder pressure, $C_p$ would vary greatly as such shifting occurred, were it not for the presence of accumulator 73.

As auxiliary frame 26 rises to a level, designated 268, which is a level approximately 6 inches above that of level 266, a quantity of fluid is forced out of cylinders 70, 72 and into conduit 254. Piston 73a in accumulator 73 is thus forced to the left, in the drawing, and compresses the gas in the left side of accumulator 73. The result is that the weight transferred to the load-distributing axle remains virtually constant, within plus or minus 1% of the load set initially with the pressure in line 254. Were it not for the presence of accumulator 73, the change in height of the load-distributing axle would simply increase the amount of weight transferred to the axles, which could conceivably result in an overload condition.

A similar series of events takes place when wheels 66 drop to a level approximately 6 inches below that of level 266, indicated by 270. In this instance, arms 78, 80 extend, thereby reducing the pressure in conduit 254. Because the left side of accumulator 73 has been charged to a predetermined amount by an air source connected to conduit 256, piston 73a is caused to move to the right, thereby exerting a force to hold the pressure in conduit 254 generally constant.

Although the pressure in cylinders 70, 72 may be varied to transfer differing amounts of weight from frame 12 to auxiliary frame 26, it is not possible to maintain the transferred weight within the desired plus or minus 1% variation over a plus or minus 6 inch change of level for all conceivable operating weights. It is therefore desirable to be able to change, selectively, the length of $D_{ra}$ such that the changes in length will accommodate the varying loads within the prescribed limit. Thus the provision of multiple pivot points, as previously indicated, allows an operator to manually shift the position of rams 70, 72 between corresponding pivot points, thereby changing the effective ram arm distance, as indicated in phantom lines in FIGS. 1 and 3 and identified, for ram 70, as 70B, 70C. The system pressures for varying weight loads with the rams positioned in the previously described pivot points are provided in the following table:

TABLE 1

| LOAD TRANSFERRED | POSITION OF CYLINDER ($D_{ra}$) | | |
|---|---|---|---|
| | ARM A 43K | ARM B 38K | ARM C 33K |
| 40K | 2211 | 2460 | 2997 |
| 38K | 2100 | 2337 | 2847 |
| 36K | 1990 | 2214 | 2697 |
| 34K | 1879 | 2090 | 2547 |
| 32K | 1769 | 1968 | 2397 |
| 30K | 1658 | 1845 | 2247 |
| 28K | 1548 | 1722 | 2098 |
| 20K | 1437 | 1598 | 1948 |
| 24K | 1326 | 1476 | 1798 |
| | CYLINDER PRESSURE (lb/in$^2$) ($C_p$) | | |

The desired operating range for $C_p$ is between approximately 2,300 pounds per square inch and 1,900 pounds per square inch and is shown in the blocked area. Thus while it is possible to operate with the cylinders in the "A" position while transferring a load of only 24,000 pounds, such operation is not desirable as the system will not transfer sufficient weight to the load-distributing axles when wheels 66 drop to the 270 level. Likewise, operating with the rams in the "C" pivot points, it is possible to transfer 40,000 pounds by providing 3,000 pounds pressure in conduit 254. However, if wheels 66 are raised to the 268 level, the system will transfer much more than 40,000 pounds to the load-distributing axle.

Once the system pressure has been set, as indicated on indicators 262, 264, no further adjustments are required. The system will continue to operate thus transferring the prescribed amount of weight to the load-distributing axles. However, indicator 264 is provided, and may be located in the vehicle cab, so that the operator may monitor pressure in the system. Indicator 264 may include a gauge and may also include an illuminated or audible warning device, which is operable should the pressure in the system depart from a predetermined range. The operation of the load distribution means is similar for the embodiment depicted in FIGS. 3 and 4.

In order to back the vehicle, auxiliary frame 26 may be lifted off of the surface by fully contracting rams 70, 72. While this eliminates the transfer of weight to the auxiliary frame, such operation may be permissible over a very short distance.

An advantage of apparatus 110 is that axles 206, 208 may be locked, by means of backup lock 226 to prevent the axles from steering and allow weight to be transferred to auxiliary frame 126 while the vehicle is backed. This feature also allows for the placement of apparatus 110 at the front of a vehicle.

Thus an improved axle load-distributing apparatus has been disclosed. The apparatus is operable to transfer a portion of a load carried on a load-carrying frame to an auxiliary frame and will transfer the load as the vehicle traverses an uneven surface. A tipping moment which may be induced about the axis of the load-carrying frame as the vehicle negotiates corners is reduced by offsetting an articulation point away from the connection between the load-carrying frame and the auxiliary frame. In the case of apparatus 110, such a tip-inducing moment is completely eliminated, and the apparatus may be placed in front of or behind the load-carrying frame.

Although a preferred embodiment of the invention has been disclosed, it should be appreciated that variations and modifications may be made thereto without departing from the spirit of the invention.

It is claimed and desired to secure by Letters Patent:

1. An axle load-distributing apparatus attachable to a load-carrying frame and a vehicle comprising:

an auxiliary frame including multiple mounting points;

attachments means located at an end of the load-carrying for securing said auxiliary frame to the load-carrying frame, wherein said attachment means includes a detachable bracket fixed to the load-carrying frame, and said auxiliary frame is fixed to said bracket at a pivot point allowing vertical movement only of said auxiliary frame relative to the load-carrying frame, said bracket including corresponding multiple mounting points;

a load-distributing axle, having wheels thereon, mounted on said auxiliary frame for supporting a portion of the weight of the load-carrying frame;

articulation means for articulating said load-distributing axle relative to said load-carrying frames, wherein said articulation means includes a self-steering axle mounted on said auxiliary frame; and load distribution means operable to distribute said portion of the weight to said load-distributing axle, said load-distributing means being located intermediate said attachment means and said articulation means, wherein said load-distributing means includes powered extensible ram means having one end mounted on said bracket and the other end mounted on said auxiliary frame, and wherein said one end of said ram means is secured to a mounting point on said bracket and the other end of said ram means is secured to a corresponding mounting point on said auxiliary frame, and said ram means is shiftable between corresponding mounting points on said bracket and said auxiliary frame for varying, within a known range, the portion of the weight distributed to said load-distributing axle.

2. The apparatus of claim 1 wherein said self-steering axle includes means for locking said axle to prevent steering thereof.

3. The apparatus of claim 1 wherein said load-distributing means is operable to adjust said auxiliary frame in the vertical relative to said load-carrying frame.

* * * * *